W. LINKE & L. DREYFUS.
DYNAMO ELECTRIC MACHINE.
APPLICATION FILED JUNE 23, 1911.
1,079,502.
Patented Nov. 25, 1913.
3 SHEETS—SHEET 1.
Fig. 1.
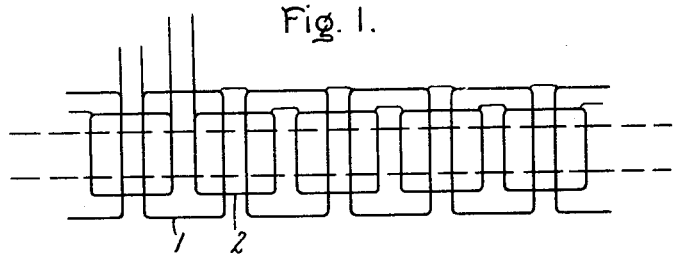
Fig. 2.
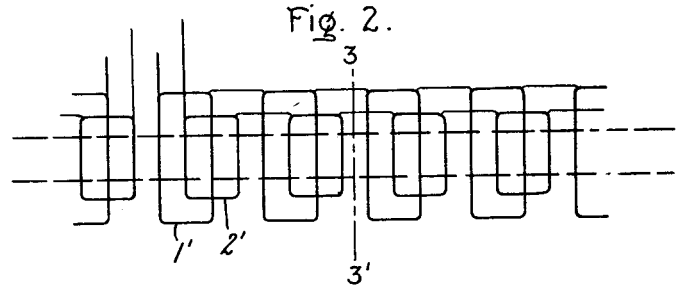
Fig. 3.
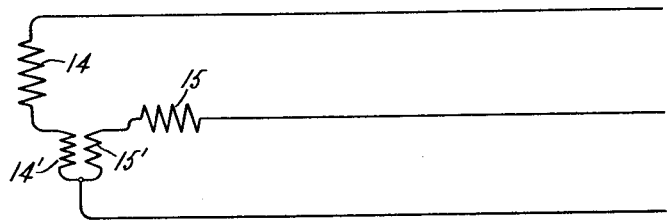
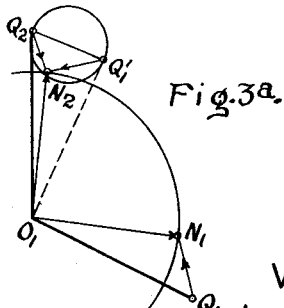
Fig. 3a.
Witnesses:
Earl G. Klock.
J. Ellis Glen
Inventors:
Willy Linke,
Ludwig Dreyfus,
by Albert G. Davis
Their Attorney

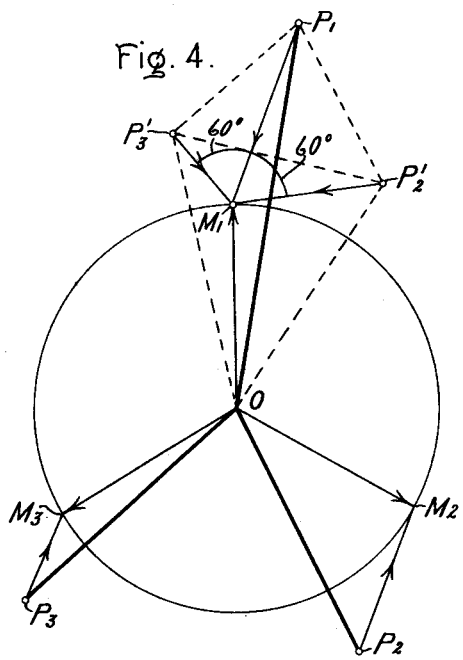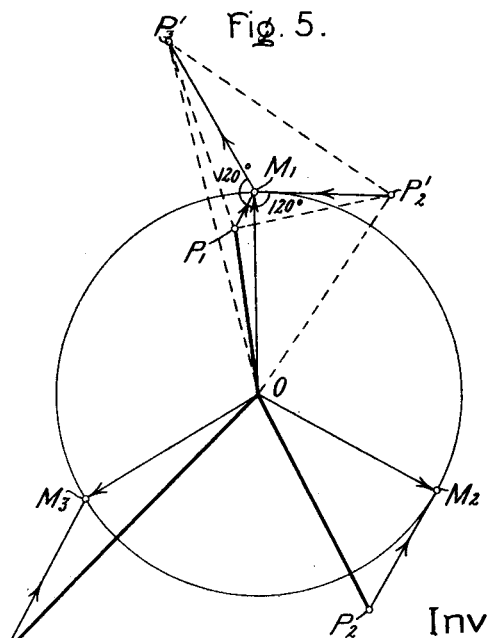

W. LINKE & L. DREYFUS.
DYNAMO ELECTRIC MACHINE.
APPLICATION FILED JUNE 23, 1911.

1,079,502.

Patented Nov. 25, 1913.
3 SHEETS—SHEET 3.

Witnesses:
Earl G. Klock.
J. Ellis Glen

Inventors:
Willy Linke,
Ludwig Dreyfus,
by Albert H. Davis
Their Attorney.

UNITED STATES PATENT OFFICE.

WILLY LINKE, OF WESTEND, AND LUDWIG DREYFUS, OF NIEDER-SCHÖNHAUSEN, GERMANY, ASSIGNORS TO GENERAL ELECTRIC COMPANY, A CORPORATION OF NEW YORK.

DYNAMO-ELECTRIC MACHINE.

1,079,502. Specification of Letters Patent. Patented Nov. 25, 1913.

Application filed June 23, 1911. Serial No. 634,942.

*To all whom it may concern:*

Be it known that we, WILLY LINKE, a subject of the King of Prussia, residing at Westend, Germany, and LUDWIG DREYFUS, a subject of the King of Great Britain, residing at Nieder-Schönhausen, Germany, have invented certain new and useful Improvements in Dynamo-Electric Machines, of which the following is a specification.

Our invention relates to polyphase alternating current dynamo electric machines and has for its object an improvement in such devices.

As usually constructed, the exciting field of such machines revolves inside of a stationary member which constitutes the armature. It is frequently advantageous to divide the armature into portions which may be fastened together, and, if the armature is symmetrically wound for the purposes of disassembling such machines, it is necessary to remove certain of the coils where the lines of division come, which coils may be put on or wound in place when the armature is assembled together. If this for any reason is undesirable, it is possible to wind the armature with a dissymmetrical arrangement of windings so that no coil will overlap the points of division and hence no coil or coils will have to be removed. Such constructions, however, cause an unbalanced self-induction in portions of the windings and hence the voltages of the phases are rendered unsymmetrical both in phase position and in magnitude.

The object of our invention is to render these symmetrical, and we accomplish this object by providing electromotive force producing means in the circuits of the windings forming seats of induced electromotive forces of phases and magnitudes adapted to accomplish this purpose.

For a further understanding of our invention, reference may be had to the accompanying drawings, where—

Figure 6:
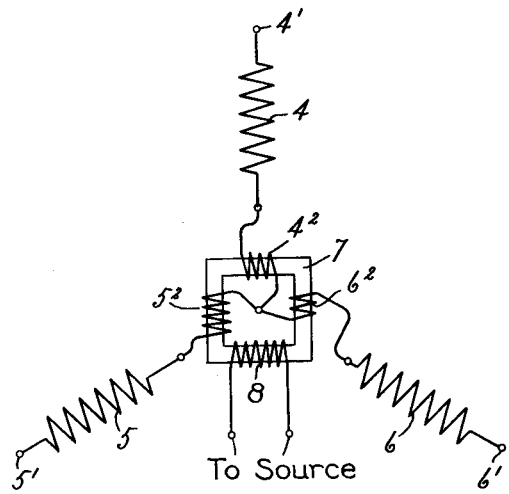
Figure 7:
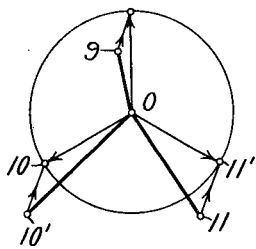
Figure 8:
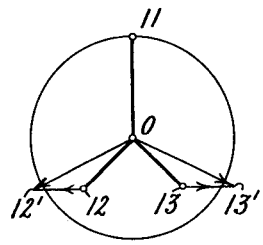

Figure 1 shows a symmetrical armature winding for a two phase machine; Fig. 2 shows an unsymmetrical winding for a two phase machine; Fig. 3 shows diagrammatically an arrangement for rendering the terminal voltages of a two phase machine symmetrical; Figs. 3$^a$, 4 and 5 are vector diagrams showing the principle upon which our invention operates in connection with a three phase machine; Fig. 6 shows diagrammatically a means which we may employ with a three phase machine for accomplishing the object of our invention; and Figs. 7 and 8 are vector diagrams showing modifications of our invention.

Referring first to Fig. 1, the coils of the two phases of a two phase symmetrical armature winding are represented as 1 and 2. From an inspection of this figure, it will be seen that if it is desired to divide the armature into portions and remove these portions, the one from the other, it will be necessary to remove or unwind coils from one or the other of the phases. The windings, however, being symmetrically disposed, there will be no dissymmetry of the terminal generated voltages in phase or magnitude.

Fig. 2 shows an arrangement of windings for a two phase machine whereby it is possible to divide the armature along the line 3—3', for example, without removing any of the coils, 1' and 2' being the coils for the two phases. Such a winding will be unsymmetrical and an unbalanced self-induction will occur in parts of the winding, thus causing the machine to generate dissymmetrical electromotive forces.

Referring now to Figs. 4 and 5, we have shown by vector diagrams, for a three phase armature, the principle upon which our invention operates. $OP_1$, $OP_2$ and $OP_3$ represent in magnitude and direction the dissymmetrical voltages of a three phase armature whose terminal voltages it is desired to make symmetrical both in phase and in magnitude. If the vectors $OP_2$ and $OP_3$ be revolved in an opposite direction with reference to the vector $OP_1$, each through an angle of 120°, as shown by the dotted lines $OP'_2$ and $OP'_3$, the triangle $P_1$, $P'_2$ and $P'_3$ may be obtained. By means of a simple geometrical relation, point $M_1$ may be obtained with reference to this triangle in such a position that the three sides of the triangle will subtend with reference to this point angles of 120°, or two sides will subtend angles of 60° each, and the third side an angle of 120°. Fig. 5 shows the position of the point $M_1$ for the former case and Fig. 4 for the latter. The vectors drawn between point $M_1$ and points $P_1$, $P'_2$ and $P'_3$ will then represent in magnitude the voltages which it is necessary to produce in the circuits of the phase windings of the machine, and the vector $M_1$ $P_1$ will represent also the phase direction of such vectors in order to render the terminal electromotive forces substantially symmetrical. It will be seen from an inspection of these figures that by combining the electromotive forces represented by the vectors $OP_1$ and $P_1 M_1$ by combining the electromotive forces represented by the vectors $OP_2$ and $P_2 M_2$, by combining the electromotive forces represented by the vectors $OP_3$ and $P_3 M_3$, the resultant terminal electromotive forces $OM_1$, $OM_2$ and $OM_3$ will be symmetrical, that is equal in magnitude and displaced from each other 120°.

Referring now to Fig. 6, we have shown diagrammatically a construction whereby such electromotive forces may be obtained. 4, 5 and 6 represent the three armature windings of a three phase machine generating dissymmetrical electromotive forces for the reasons stated above. In accordance with our invention in order to render the terminal electromotive forces, that is, the electromotive forces between the terminals 4', 5' and 6', symmetrical, we provide electromotive force producing means in the circuits of these windings forming seats of induced electromotive forces of a phase and of magnitudes adapted to accomplish this result. To obtain these electromotive forces, we may employ a transformer comprising single iron core 7, about which are wound auxiliary or secondary windings $4^2$, $5^2$ and $6^2$ connected each in series with one of the windings of the armature and having a number of turns sufficient to produce the desired magnitudes therefor. Wound about the same core is an energizing or primary winding 8 which may be connected to a suitable source of electromotive force which has not been shown. It will be seen from an inspection of this figure, taking it in conjunction with the principles which we have enunciated with reference to Figs. 4 and 5, that the winding 8 will induce in each of the auxiliary windings $4^2$, $5^2$ and $6^2$ electromotive forces, these electromotive forces being of a substantially similar phase, and, by properly proportioning the number of turns in these auxiliary windings, magnitudes for these electromotive forces may be obtained of such a value that the terminal electromotive forces will be substantially symmetrical.

While we have shown one arrangement for obtaining these electromotive forces of the desired magnitude and phase, it will be obvious that other arrangements and modifications will suggest themselves to those skilled in the art, and we do not limit ourselves to the method of connections shown in Fig. 6.

Under some circumstances the energizing winding 8 on the iron core 7 in Fig. 6 may be omitted, in which case the operation of the transformer depends upon the mutual inductance of the auxiliary or secondary windings $4^2$, $5^2$ and $6^2$, and the sum of the ampere turns employed determines the flux of the transformers. In three-phase machines, in general, the resulting excitation of the transformer will preferably coincide with the direction of one of the three phase currents. Thus if a phase permits an increase of its self induction, the other phases may be compensated for at the expense of the first. Fig. 7 is a vector diagram similar to Fig. 5, and obtained in a similar manner, except that the primary of the secondary transformer is dispensed with. In this case one of the phases $O^{10'}$ has its self induction increased, while phase $O^9$ has its voltage increased at the expense of phase $O^{10'}$. If however, a phase has a particularly large inductive drop, as for instance $O^{11}$ in Fig. 8, then it is possible to confine the regulation to the other two phases alone, as shown in this diagram. In this case, a substantially symmetrical arrangement of the voltages may be obtained.

While we have explained our invention with reference to three phase machines, it will be obvious that the same principle will apply to two phase machines also. In such machines, in order to find the phase and magnitudes of the voltages to be impressed upon the phase windings, the same method as that explained with reference to Figs. 4 and 5 may be used, but, in this case, the angles which are subtended from the point $M_1$ will be 90°. Such a vector diagram is shown in Fig. 3ª. $O_1 Q_1$ and $O_1 Q_2$ represent in magnitude and direction the dissymmetrical voltages of a two phase armature winding whose terminal voltage, it is desired to make symmetrical both in phase and magnitude. If the vector $O_1 Q_1$ be revolved through an angle of 90° as shown by the dotted line $Q_1 Q_1'$, a line $Q_1' Q_2$ may be drawn. A point $N_2$ is selected which, with reference to this line, subtends an angle of 90°. The vectors drawn from $Q_1'$ and $Q_2$ to the point $N_2$ will then represent in magnitude, the voltages which it is necessary to produce in the circuits of the phase windings of the machine, and the vector $Q_2 N_2$ will represent the phase direction of such vectors in order to render the terminal electromotive forces substantially symmetrical. It will be seen from an inspection of Fig. 3ª that by combining the electromotive forces represented by the vectors $Q_1 Q_2$ and $Q_2 N_2$, and combining the electromotive forces represented by the vectors $O_1 Q_1$ and $Q_1 N_1$, the resultant terminal electromotive forces $O_1 N_1$ and $O_1 N_2$ will be symmetrical, that is, equal in magnitude and displaced from each other 90°. Since there is an infinite number of points $N_2$, which with reference to the line $Q_1' Q_2$ will subtend an angle of 90°, there will be an infinite number of voltages which may be used, and it is desirable to select voltages which may be obtained without the use of an external energizing source, that is to say, as will be obvious, the field windings themselves may be used for this purpose. Such a method of connections is shown in Fig. 3, where 14 and 15 represent the two armature windings for the two phases and 14' and 15' represent the auxiliary electromotive force producing windings which may be wound upon the same core, which is not shown. This same principle of obtaining the impressed voltages from the armature windings themselves may also be applied to any polyphase machine, as will be obvious, and we have not considered it necessary to illustrate the same.

It will be obvious to those skilled in the art that many connections and arrangements may be employed for accomplishing the object of our invention other than those described, and we do not limit ourselves to such connections but seek in the appended claims to cover all connections and embodiments of our invention which will not depart from the spirit of the same.

What we claim as new and desire to secure by Letters Patent of the United States, is:—

1. In combination, a polyphase alternating current dynamo electric machine having a winding for each phase and generating dissymmetrical electromotive forces, and electromotive force producing means in the circuits of said windings forming seats of induced electromotive forces of phases and magnitudes adapted to make the terminal electromotive forces substantially symmetrical.

2. In combination, a polyphase alternating current dynamo electric machine having a winding for each phase and generating dissymmetrical electromotive forces, and means for producing in the circuits of said windings electromotive forces of the same phase and of magnitudes adapted to make the terminal electromotive forces substantially symmetrical.

3. In combination, a polyphase alternating current dynamo electric machine having a winding for each phase and generating dissymmetrical electromotive forces, auxiliary electromotive force producing windings in series with said windings of said dynamo electric machine forming seats of induced electromotive forces adapted to make the terminal electromotive forces substantially symmetrical.

4. In combination, a polyphase alternating current dynamo electric machine having a winding for each phase and generating dissymmetrical electromotive forces, auxiliary electromotive force producing windings in series with said windings of said dynamo electric machine forming seats of induced electromotive forces of the same phase and magnitudes adapted to make the terminal electromotive forces substantially symmetrical.

5. In combination, a polyphase alternating current dynamo electric machine having a winding for each phase and generating dissymmetrical electromotive forces, an iron core, a winding on said core, auxiliary windings in inductive relation with said winding on said core, in series with the phase windings of said dynamo electric machine and producing in the circuits of said windings electromotive forces of the same phase and of magnitudes adapted to render the terminal electromotive forces substantially symmetrical.

6. In a combination, a polyphase alternating current dynamo electric machine having a winding for each phase and generating dissymmetrical electromotive forces, a transformer having a primary winding and secondary windings, each secondary winding being in series with one of the phase windings of said dynamo electric machine and producing in the circuits of said windings of the dynamo electric machine electromotive forces adapted to render the terminal electromotive forces substantially symmetrical.

In witness whereof, we have hereunto set our hands this 26th day of May, 1911.

WILLY LINKE.
LUDWIG DREYFUS.

Witnesses:
CARL DIETRICH,
MOSE HULBIG.

Copies of this patent may be obtained for five cents each, by addressing the "Commissioner of Patents, Washington, D. C."